(12) United States Patent
Otake

(10) Patent No.: US 9,047,036 B2
(45) Date of Patent: *Jun. 2, 2015

(54) DISPLAY APPARATUS, PRINT CONTROL METHOD, AND PROGRAM

(71) Applicant: CANON KABUSHIKI KAISHA, Tokyo (JP)

(72) Inventor: Ritsuko Otake, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/768,968

(22) Filed: Feb. 15, 2013

(65) Prior Publication Data

US 2013/0155461 A1    Jun. 20, 2013

Related U.S. Application Data

(63) Continuation of application No. 11/871,832, filed on Oct. 12, 2007, now Pat. No. 8,405,839.

(30) Foreign Application Priority Data

Dec. 15, 2006  (JP) ................................ 2006-338678

(51) Int. Cl.
*G06F 3/12* (2006.01)
*G06K 9/32* (2006.01)
*G06K 9/60* (2006.01)
*G06F 3/048* (2013.01)
*H04N 1/00* (2006.01)

(52) U.S. Cl.
CPC .......... *G06F 3/1296* (2013.01); *H04N 1/00307* (2013.01); *H04N 1/00519* (2013.01); *H04N 1/00535* (2013.01); *H04N 1/00559* (2013.01)

(58) Field of Classification Search
CPC ... G06F 3/1256; G06F 3/1208; G06F 3/1205; G06F 3/1285; H04N 1/0044
USPC ......... 358/1.15, 1.13; 382/296, 305; 715/209, 715/838
See application file for complete search history.

(56) References Cited

U.S. PATENT DOCUMENTS 6,453,078 B2 *   9/2002   Bubie et al. ................... 382/305

FOREIGN PATENT DOCUMENTS

| JP | 2004-199256 A | 7/2004 |
| JP | 2006-055522 A | 3/2006 |
| JP | 2006-300977 A | 11/2006 |
| JP | 2006-338281 A | 12/2006 |

* cited by examiner

*Primary Examiner* — Charlotte M Baker
(74) *Attorney, Agent, or Firm* — Canon USA, Inc., IP Division

(57) ABSTRACT

A display apparatus displays an identification information element corresponding to an image currently displayed on a display unit in accordance with a first instruction from a user. In accordance with a second instruction from the user, the display apparatus causes a printing apparatus to perform printing based on an image data element corresponding to an identification information element selected by the user from among one or more identification information elements being displayed.

25 Claims, 14 Drawing Sheets

DISPLAY APPARATUS, PRINT CONTROL METHOD, AND PROGRAM

CROSS REFERENCE TO RELATED APPLICATIONS

The present application is a continuation of U.S. patent application Ser. No. 11/871,832, filed on Oct. 12, 2007, which claims priority from Japanese Patent Application No. 2006-338678, filed Dec. 15, 2006, all of which are hereby incorporated by reference herein in their entirety.

BACKGROUND OF THE INVENTION

1. Field of the Invention

The present invention relates to a display apparatus that displays an image, a method for controlling printing of an image, and a program for controlling printing of an image.

2. Description of the Related Art

A system that prints a document used in a conference (e.g., presentation material) or transmits electronic data of the document by email in accordance with a request of a participant is known (see, for example, Japanese Patent Laid-Open No. 2002-369167).

In this system, when a participant wants to obtain a slide displayed on a display apparatus as a piece of presentation material, the participant operates a portable terminal and informs a server of a request to print a currently displayed slide. In response to the request, the server identifies which participants are making requests and what material and which pages are being requested and stores information about them. When the presentation is completed, the server transmits electronic data of the slide desired by the participant to a printer based on the stored information. Then, the slide is printed by the printer.

Depending on the content of presentation material or the membership status of a participant in a conference, it may be impossible to distribute all pages of the presentation material to all the participants. For example, if presentation material contains a page including confidential information, the page may be permitted to be viewed by participants as part of an announcement, but distribution of the page in printed form may be restricted.

Thus, it is difficult for a participant to identify which pages of presentation material are permitted to be taken away in printed form and which pages are not.

SUMMARY OF THE INVENTION

The present invention provides a technique that enables specifying of one or more printable images from among a plurality of images sequentially displayed on a display apparatus and enables further specifying of an image to be actually printed from among the printable images.

According to an aspect of the present invention, a display apparatus includes a display unit, an identification-information displaying unit, and a print control unit. The display unit is configured to display an image. The identification-information displaying unit is configured to, in accordance with a first instruction from a user, display an identification information element identifying an image data element corresponding to an image currently displayed on the display unit. The print control unit is configured to, in accordance with a second instruction from the user, cause a printing apparatus to perform printing based on an image data element corresponding to an identification information element selected by the user from among one or more identification information elements being displayed by the identification-information displaying unit.

According to another aspect of the present invention, a display apparatus includes a display unit, a list displaying unit, and a print control unit. The display unit is configured to display an image. The list displaying unit is configured to, in accordance with a first instruction from a user, display a list of one or more image data elements including an image data element corresponding to an image currently displayed on the display unit. The print control unit is configured to, in accordance with a second instruction from the user, cause a printing apparatus to perform printing based on an image data element selected by the user from the list being displayed by the list displaying unit.

According to still another aspect of the present invention, a print control method for controlling printing of an image displayable on a display apparatus for use in the display apparatus includes causing the display apparatus to, in accordance with a first instruction from a user, display an identification information element identifying an image data element corresponding to an image currently displayed on the display unit and causing a printing apparatus to, in accordance with a second instruction from the user, perform printing based on an image data element corresponding to an identification information element selected by the user from among one or more identification information elements being displayed by the identification-information displaying unit.

According to another aspect of the present invention, a print control method for controlling printing of an image displayable on a display apparatus for use in the display apparatus includes causing the display apparatus to, in accordance with a first instruction from a user, display a list of one or more image data elements including an image data element corresponding to an image currently displayed on the display unit and causing a printing apparatus to, in accordance with a second instruction from the user, perform printing based on an image data element selected by the user from the list being displayed by the list displaying unit.

Not all features of the present invention are described in this summary. The present invention encompasses other claims and any combination of features of the claims.

Further features of the present invention will become apparent from the following description of exemplary embodiments with reference to the attached drawings, in which like reference characters designate the same or similar parts throughout the figures thereof.

DESCRIPTION OF THE EMBODIMENTS

Exemplary Embodiments of the present invention will now be described in detail with reference to the accompanying drawings. It should be noted that the embodiments below do not limit the present invention set forth in the claims.

First Embodiment

Figure 1:
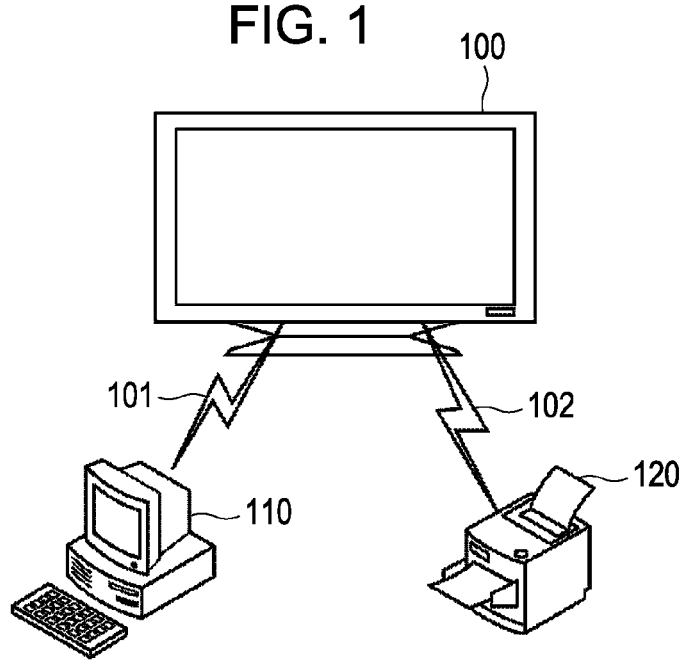
FIG. 1 illustrates an example of the structure of a system to which the present invention can be suitably applied.

FIG. 1 shows a structure of a system to which the present invention can be suitably applied. A display apparatus 100 displays an image based on of a control signal from an information processing apparatus 110 or from a central processing unit (CPU) of the display apparatus 100. Various types of displays, for example, a liquid crystal display (LCD) or a cathode-ray tube (CRT), can be used in an image display portion in the display apparatus 100. Any display method can be used.

The information processing apparatus 110 generates image data to be displayed on the display apparatus 100. The information processing apparatus 110 transmits the image data to the display apparatus 100 and also transmits a control signal that controls displaying of the image data to the display apparatus 100. Examples of the information processing apparatus 110 include a personal computer and a workstation.

A printing apparatus 120 prints an image on a sheet based on image data from the display apparatus 100 in accordance with a control signal from the display apparatus 100. Examples of the printing apparatus 120 include a laser beam printer and an ink jet printer.

A communication medium 101 connects the display apparatus 100 and the information processing apparatus 110 together. Examples of the communication medium 101 include a network, a wireless local-area network (LAN), and a universal serial bus (USB). A communication medium 102 connects the display apparatus 100 and the printing apparatus 120 together. Examples of the communication medium 102 include a network, a wireless LAN, and a USB. The communication medium 101 and the communication medium 102 may be the same.

Figure 2:
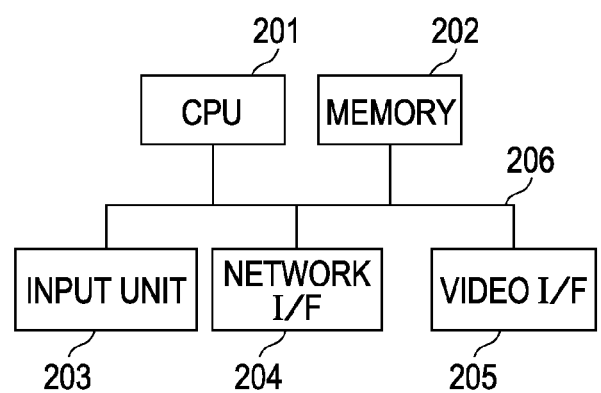
FIG. 2 illustrates a hardware configuration of an image forming apparatus.

FIG. 2 illustrates a hardware configuration of the image forming apparatus 110. The information processing apparatus 110 includes a CPU 201, a memory 202, an input unit 203, a network interface (I/F) 204, a video I/F 205, and a communication bus 206. The information processing apparatus 110 may include a different display apparatus from the display apparatus 100.

The CPU 201 controls operation of the information processing apparatus 110. The memory 202 stores data for use in the CPU 201. The input unit 203 is used by a user to input various kinds of information. Examples of the input unit 203 include a keyboard, a mouse, and a tablet.

The network I/F 204 connects the information processing apparatus 110 to a network and allows the information processing apparatus 110 to exchange data over the network. The video I/F 205 transmits a control signal for controlling the display apparatus 100 and image data to be displayed on the display apparatus 100 to the display apparatus 100. The communication bus 206 connects the CPU 201, the memory 202, the input unit 203, the network I/F 204, and the video I/F 205 together.

Figure 3:
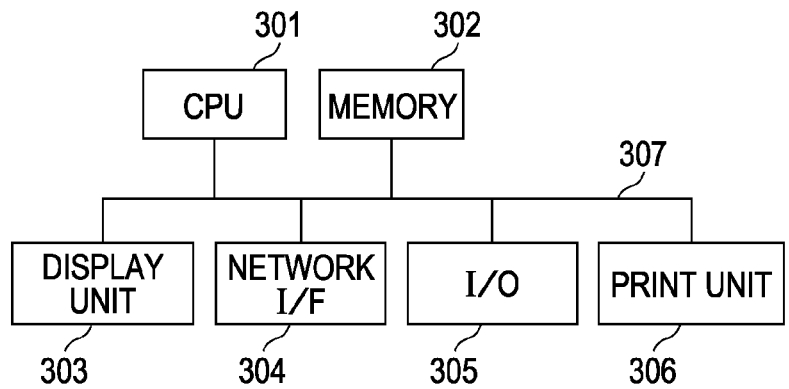
FIG. 3 illustrates a hardware configuration of a printing apparatus.

FIG. 3 illustrates a hardware configuration of the printing apparatus 120. The printing apparatus 120 includes a CPU 301, a memory 302, a display unit 303, a network I/F 304, an input-output I/F 305, a print unit 306, and a communication bus 307.

The CPU 301 controls operation of the printing apparatus 120. Additionally, the CPU 301 converts externally input image data into a record signal interpretable by the print unit 306. The memory 302 stores data for use in the CPU 301. The display unit 303 displays information indicating the progress of printing and information indicating the status of the printing apparatus 120.

The network I/F 304 connects the printing apparatus 120 to a network and allows the printing apparatus 120 to exchange data over the network. The input-output I/F 305 connects the printing apparatus 120 and an external device together and allows the printing apparatus 120 to exchange information with the external device. The print unit 306 prints an image on a sheet in accordance with a record signal. The print unit 306 can use various print methods, such as ink-jet, laser-beam, or dye-sublimation. Any print method can be used. The communication bus 307 connects the CPU 301, the memory 302, the display unit 303, the network I/F 304, the input-output I/F 305, and the print unit 306.

Figure 4:
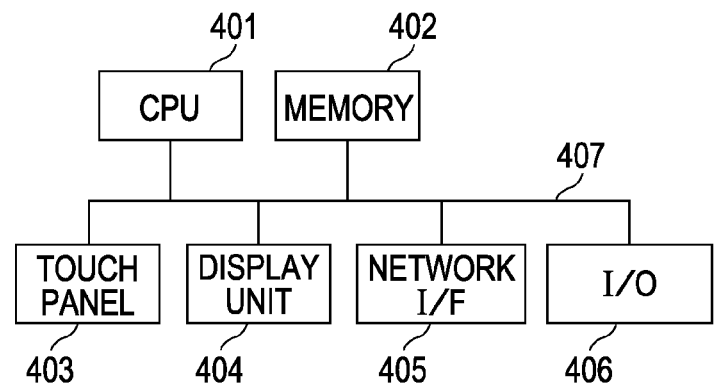
FIG. 4 illustrates a hardware configuration of a display apparatus.

FIG. 4 illustrates a hardware configuration of the display apparatus 100. The display apparatus 100 includes a CPU 401, a memory 402, a touch panel 403, a display unit 404, a network I/F 405, an input-output I/F 406, and a communication bus 407.

The CPU 401 controls operation of the display apparatus 100. The memory 402 stores data for use in the CPU 401. The touch panel 403 is attached on the surface of the display unit 404 and receives entry of data and instructions from a user. The display unit 404 displays an image based on image data. The image data is transmitted from the information processing apparatus 110, and is received by the display apparatus 100 via the network I/F 405 or the input-output I/F 406.

The network I/F 405 connects the display apparatus 100 to a network and allows the display apparatus 100 to exchange information over the network. The input-output I/F 406 connects the display apparatus 100 and an external device together and allows the display apparatus 100 to exchange information with the external device. The communication bus 407 connects the CPU 401, the memory 402, the touch panel 403, the display unit 404, the network I/F 405, and the input-output I/F 406 together.

Figure 5:
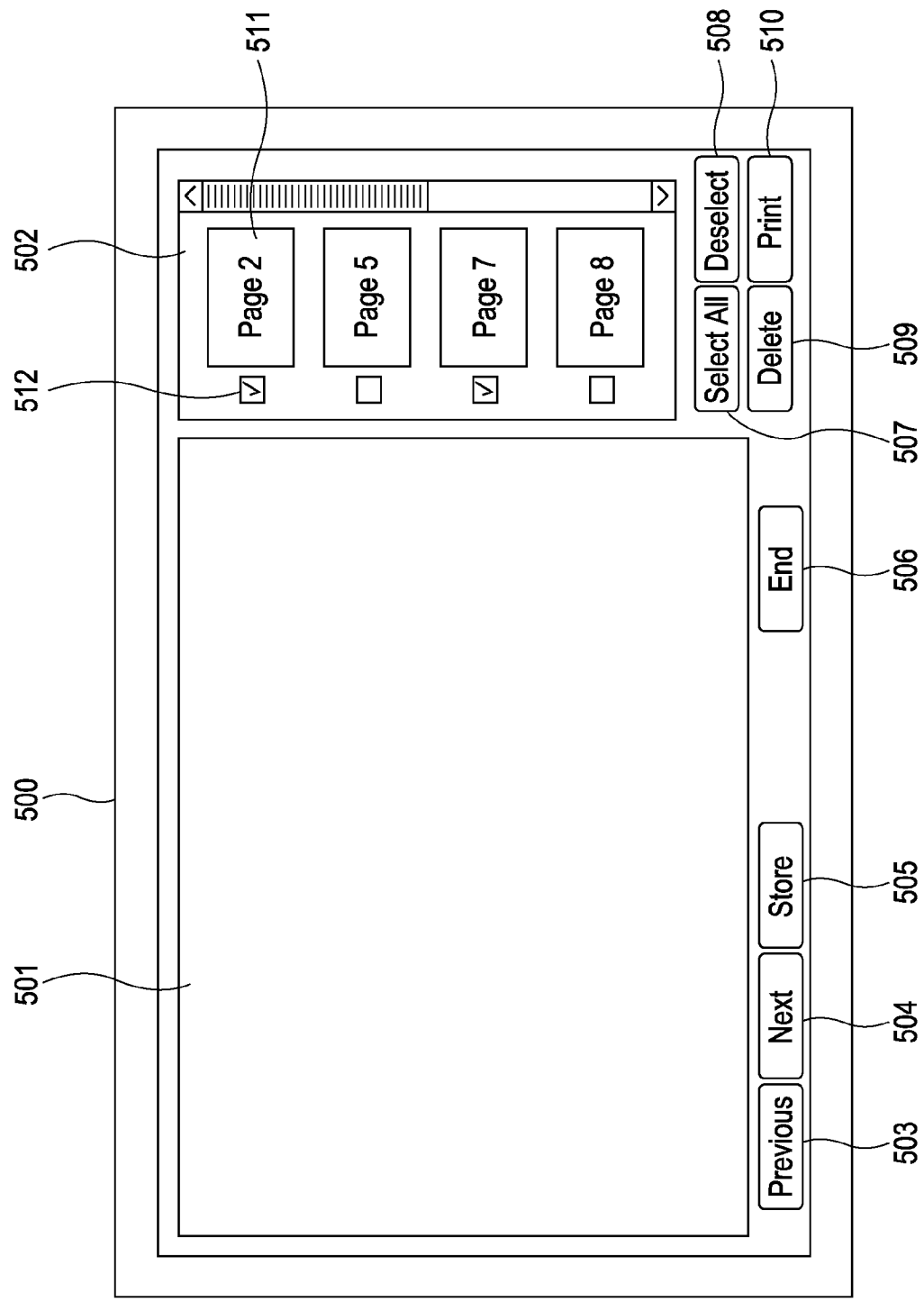
FIG. 5 illustrates a screen layout displayed on the display apparatus.

FIG. 5 illustrates a screen layout displayed on the display apparatus 100. The display apparatus 100 can perform overlay display, which displays images corresponding to respective image data elements in accordance with respective controls. A main display area 501, a thumbnail-image display area 502, and buttons 503 to 510 are arranged on a screen 500.

An image based on image data received from the information processing apparatus 110 is displayed in the main display area 501 in accordance with an instruction from the information processing apparatus 110. When the image based on the image data is presentation material, the user basically views the main display area.

When the user presses the button 504 ("Next"), the display apparatus 100 issues a request of image data corresponding to a next page to the information processing apparatus 110. In response to the request, the information processing apparatus 110 transmits the image data for the next page to the display apparatus 100. When the user presses the button 503 ("Previous"), the display apparatus 100 issues a request of image data corresponding to a previous page to the information processing apparatus 110. In response to the request, the information processing apparatus 110 transmits the image data for the previous page to the display apparatus 100. The buttons 503 and 504 function in an auxiliary manner in a presentation, so both buttons may be omitted.

When the user presses the button 505 ("Store"), the display apparatus 100 stores image data corresponding to an image currently displayed in the main display area 501 in a first storage region in the memory 402. As a result, a thumbnail image as identification information for identifying stored image data is added to and thus displayed in the thumbnail-image display area 502. For example, when a person making a presentation determines that a currently displayed page is allowed to be printed, the person presses the button 505. Therefore, a thumbnail image indicating a printable page is displayed in the thumbnail-image display area 502.

A thumbnail image 511 as identification information for identifying stored image data and a check box 512 used for selection of the thumbnail image 511 are displayed in the thumbnail-image display area 502. That is, in the thumbnail-image display area 502, a list of one or more thumbnail images corresponding to respective stored image data elements and their associated check boxes is displayed. When the user checks the check box 512, the thumbnail image 511 corresponding to the check box 512 is changed to a selected state. Then, when the user unchecks the check box 512, the thumbnail image 511 returns to a deselected state. In a selected state, a check mark is displayed in the check box. In an example illustrated in FIG. 5, a thumbnail image corresponding to page 2 and a thumbnail image corresponding to page 7 are in a selected state.

When the user presses the button 507 ("Select All"), all thumbnail images in the thumbnail-image display area 502 become selected, and all check boxes 512 display check marks. When the user presses the button 508 ("Deselect"), one or more currently selected thumbnail images are changed to a deselected state, and all displayed check marks disappear.

When the user presses the button 509 ("Delete"), a currently selected thumbnail image is removed from the thumbnail-image display area 502, and image data corresponding to the thumbnail image is deleted from the first storage region in the memory 402. In addition, thumbnail-image data corresponding to the thumbnail image is deleted from a second storage region. At this time, a message asking the user whether deletion is desired may be shown before the image data is actually deleted. Displaying the message is controlled by the CPU 401.

When the user presses the button 510 ("Print"), image data corresponding to one or more currently selected thumbnail images becomes subjected to a printing process.

Figure 6:
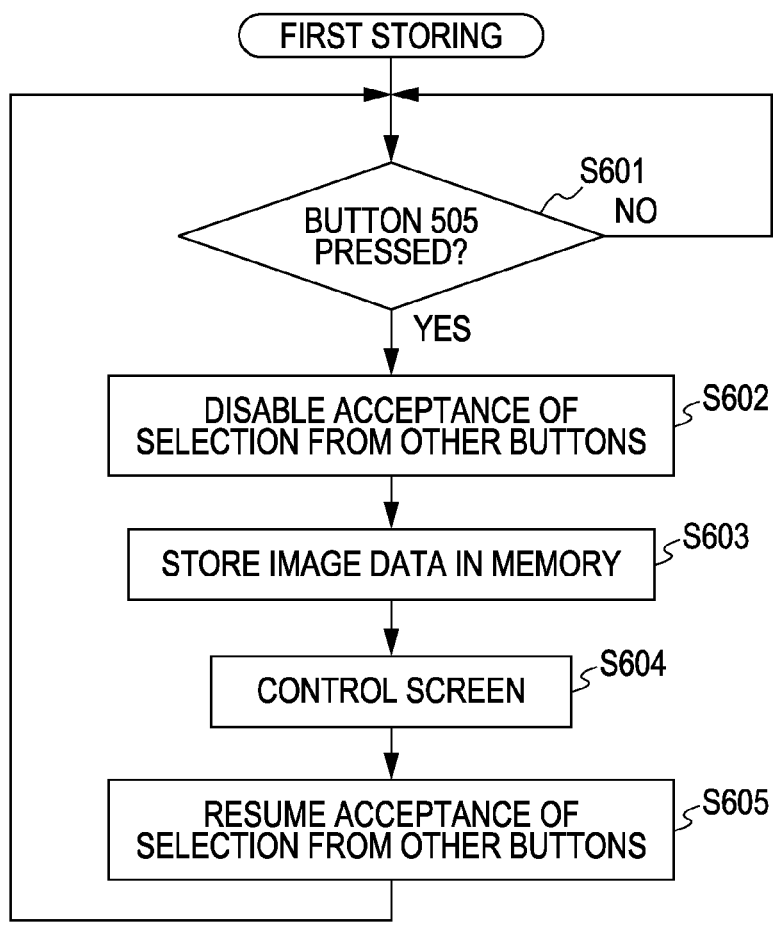
FIG. 6 is a flowchart that illustrates a storing process performed by the display apparatus.

FIG. 6 is a flowchart that illustrates a first storing process performed by the display apparatus 100. The first storing process is performed by the CPU 401 executing a program based on this flowchart.

In step S601, the display apparatus 100 determines whether the button 505 to store a displayed image has been pressed. When pressing of the button 505 is determined (YES in step S601), flow proceeds to step S602.

In step S602, the display apparatus 100 disables the acceptance of selection from the other buttons displayed on the screen 500 and of a command for changing a displayed page from the information processing apparatus 110. In step S603, the display apparatus 100 stores image data corresponding to an image currently displayed in the main display area 501 in the first storage region in the memory 402. At this time, the display apparatus 100 encrypts the image data and stores the encrypted image data in the memory 402.

In step S604, the display apparatus 100 generates thumbnail-image data reduced from a displayed image based on the image data stored in step S603 and stores the thumbnail-image data in the second storage region in the memory 402. Then, a thumbnail image based on the thumbnail-image data is displayed in the thumbnail-image display area 502.

In step S605, the display apparatus 100 resumes the acceptance of (enables) selection from the other buttons displayed on the screen 500 and of a command for changing a displayed image from the information processing apparatus 110. Processing then returns to step S601.

Figure 7:
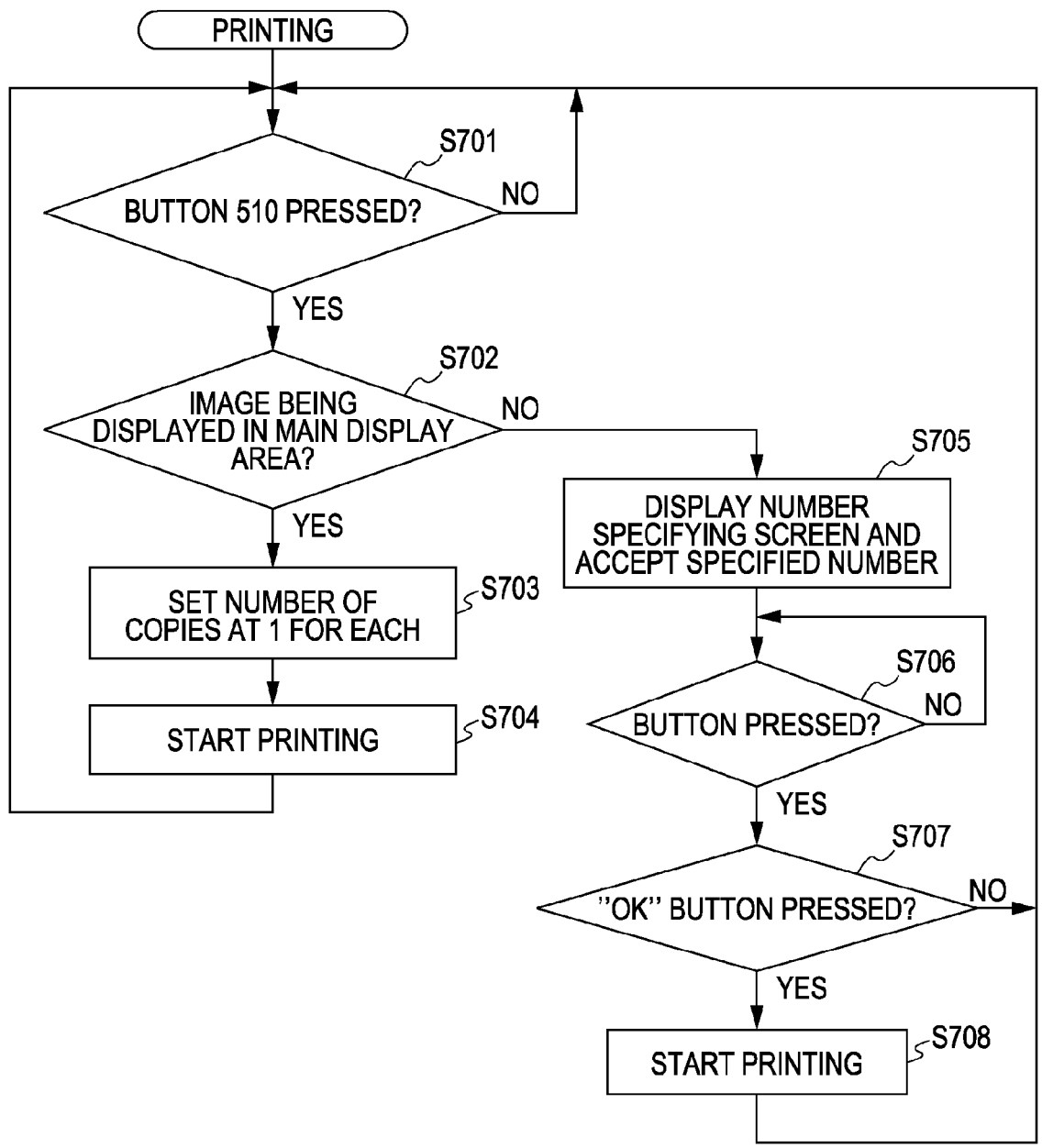
FIG. 7 is a flowchart that illustrates a printing process performed by the display apparatus.

FIG. 7 is a flowchart that illustrates a printing process performed by the display apparatus 100. The printing process is performed by the CPU 401 executing a program based on this flowchart.

In step S701, the display apparatus 100 determines whether the button 510 to print one or more selected images has been pressed. When pressing of the button 510 is determined (YES in step S701), flow proceeds to step S702.

In step S702, the display apparatus 100 determines whether image displaying using the main display area 501 is being performed. If it is determined that image displaying using the main display area 501 is being performed (YES in step S702), flow proceeds to step S703; if not (NO in step S702), flow proceeds to step S705.

In step S703, the display apparatus 100 sets the number of copies to be printed for each of one or more selected thumbnail images at one. In step S704, the display apparatus 100 transmits, to the printing apparatus 120, image data corresponding to each of the selected thumbnail images together with information indicating the set number of copies (hereinafter referred to as "number information"). If a plurality of thumbnail images is selected, the number information and the image data are transmitted to the printing apparatus 120 for each of the thumbnail images. If the image data is in a form interpretable by the printing apparatus 120, the display apparatus 100 may transmit the image data to the printing apparatus 120 without converting it. Alternatively, after the display apparatus 100 converts the image data into a form interpretable by the printing apparatus 120, the display apparatus 100 may transmit the converted image data to the printing apparatus 120. Processing then returns to step S701.

In step S705, the display apparatus 100 displays a screen used for specifying the number of copies to be printed and accepts specifying of the number of copies to be printed for each of one or more selected thumbnail images.

Figure 8:
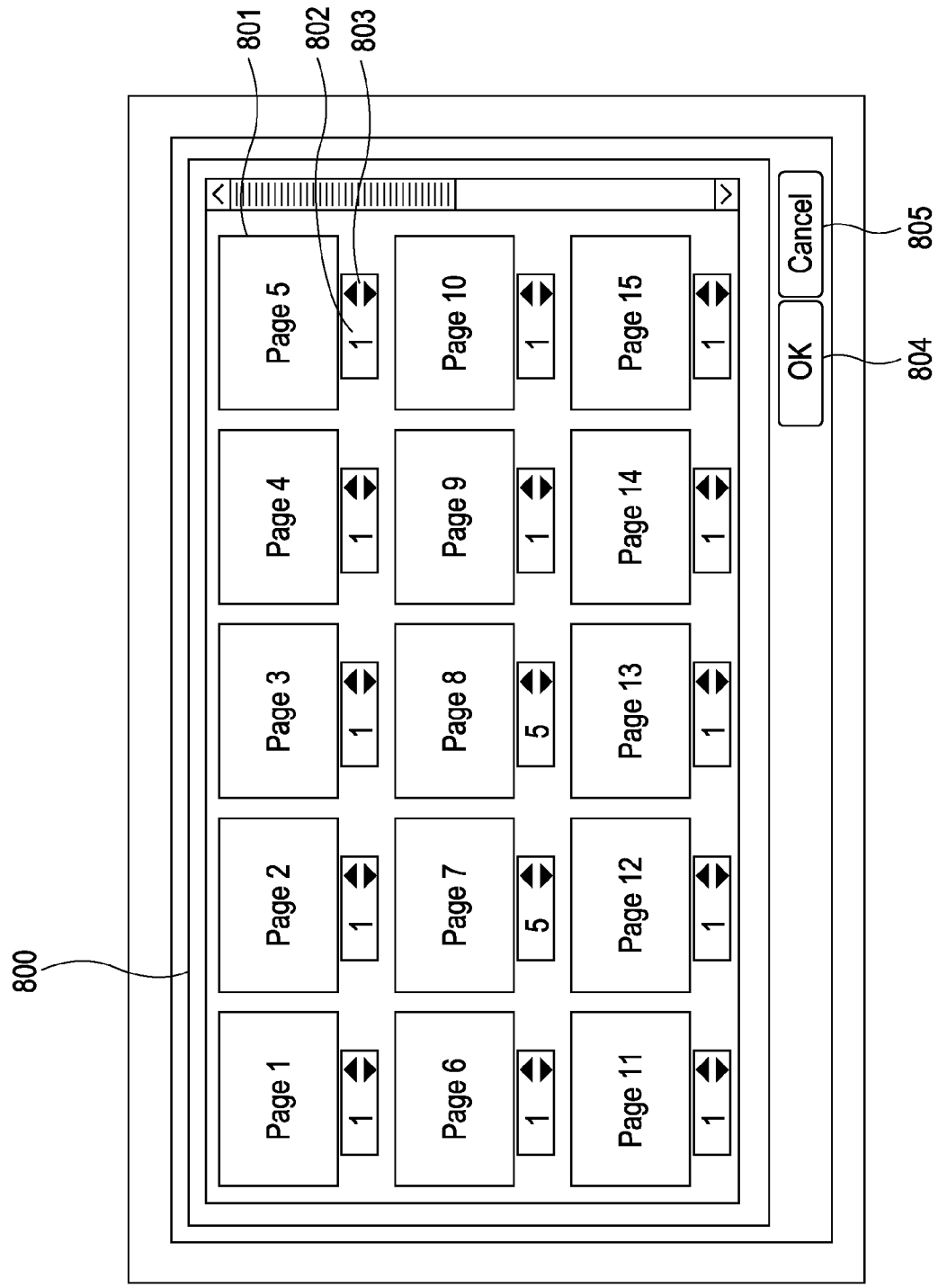
FIG. 8 illustrates an example of a screen that allows a user to specify the number of copies to be printed.

FIG. 8 illustrates an example of a screen used for specifying the number of copies to be printed. A list of selected thumbnail images is displayed on a screen 800. A thumbnail image 801 is provided with a button 803 and a display area 802 displaying the number of copies to be printed. By pressing of the button 803 by the user, the number of copies to be printed is incremented or decremented. By default, the number of copies to be printed for each thumbnail image is one. In an example illustrated in FIG. 8, the number of copies to be printed for thumbnail images of pages 7 and 8 is five, and that of the remaining pages is one.

In step S706, the display apparatus 100 determines whether either one of buttons 804 and 805 has been pressed. If pressing of either button is determined (YES in step S706), flow proceeds to step S707. In step S707, the display apparatus 100 determines whether the button 804 ("OK") has been pressed. If pressing of the OK button 804 is determined (YES in step S707), flow proceeds to step S708. If, in step S707, pressing of the button 805 ("Cancel") is determined (NO in step S707), flow returns to step S701 to cancel the printing process.

In step S708, the display apparatus 100 transmits, to the printing apparatus 120, image data corresponding to a selected thumbnail image together with number information indicating the number of copies to be printed specified on the screen 800. If a plurality of thumbnail images is selected, the number information and the image data are transmitted to the printing apparatus 120 for each of the thumbnail images. If the image data is in a form interpretable by the printing apparatus 120, the display apparatus 100 may transmit the image data to the printing apparatus 120 without converting it. Alternatively, after the display apparatus 100 converts the image data into a form interpretable by the printing apparatus 120, the display apparatus 100 may transmit the converted image data to the printing apparatus 120.

Figure 9:
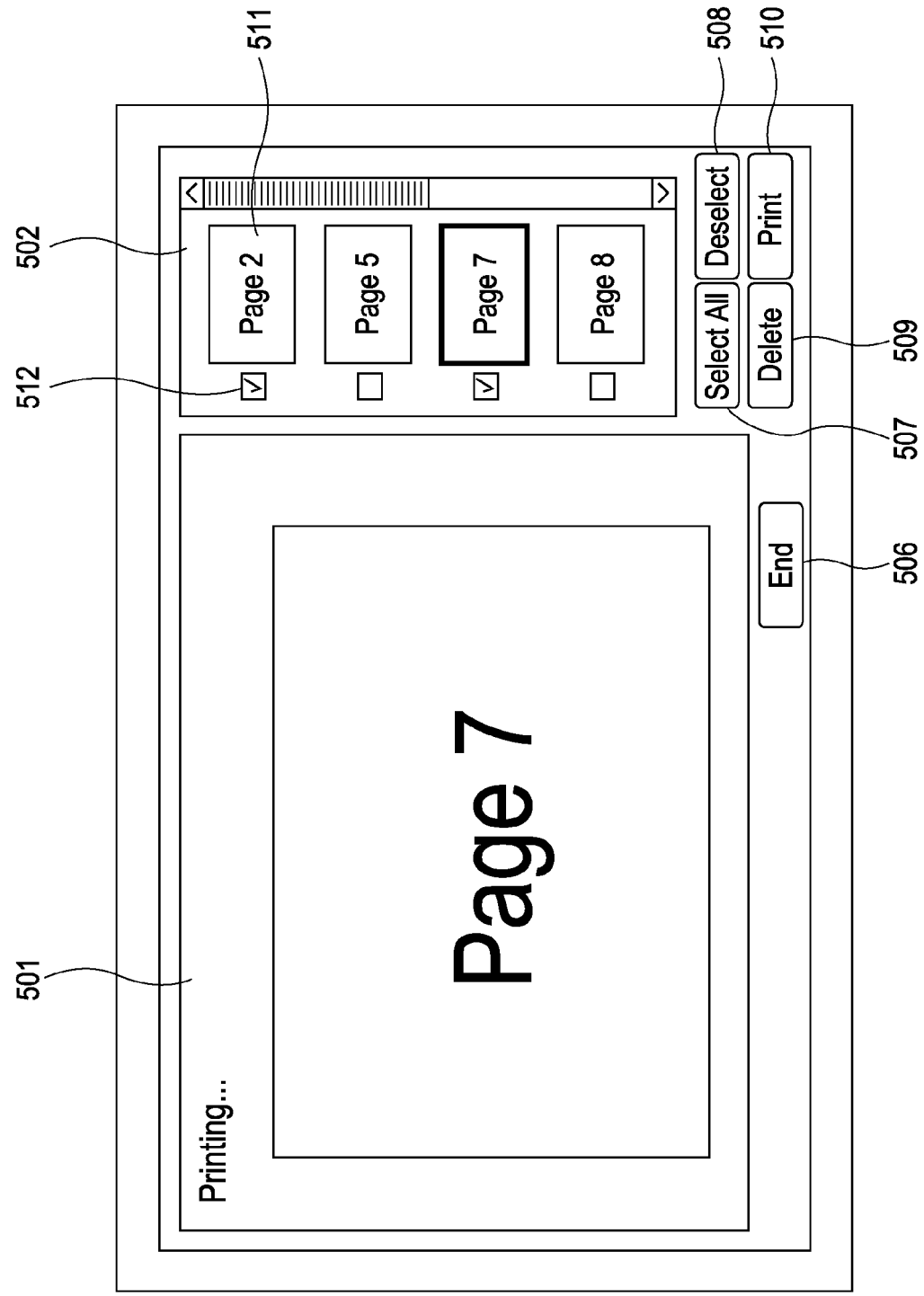
FIG. 9 illustrates an example of a preview screen.

In step S708, the display apparatus 100 sequentially displays previews of image data elements being printed. FIG. 9 illustrates an example of a preview screen.

Image data being printed is previewed on the main display area 501. A thumbnail image corresponding to the currently previewed image data is highlighted on the thumbnail-image display area 502. Highlighting can be performed by, for example, use of a different color for a frame. Although not illustrated, a numerical value that indicates the total number of image data elements to be printed or that indicates the ordinal position of a currently previewed image data element in the image data elements may be displayed.

Figure 10:
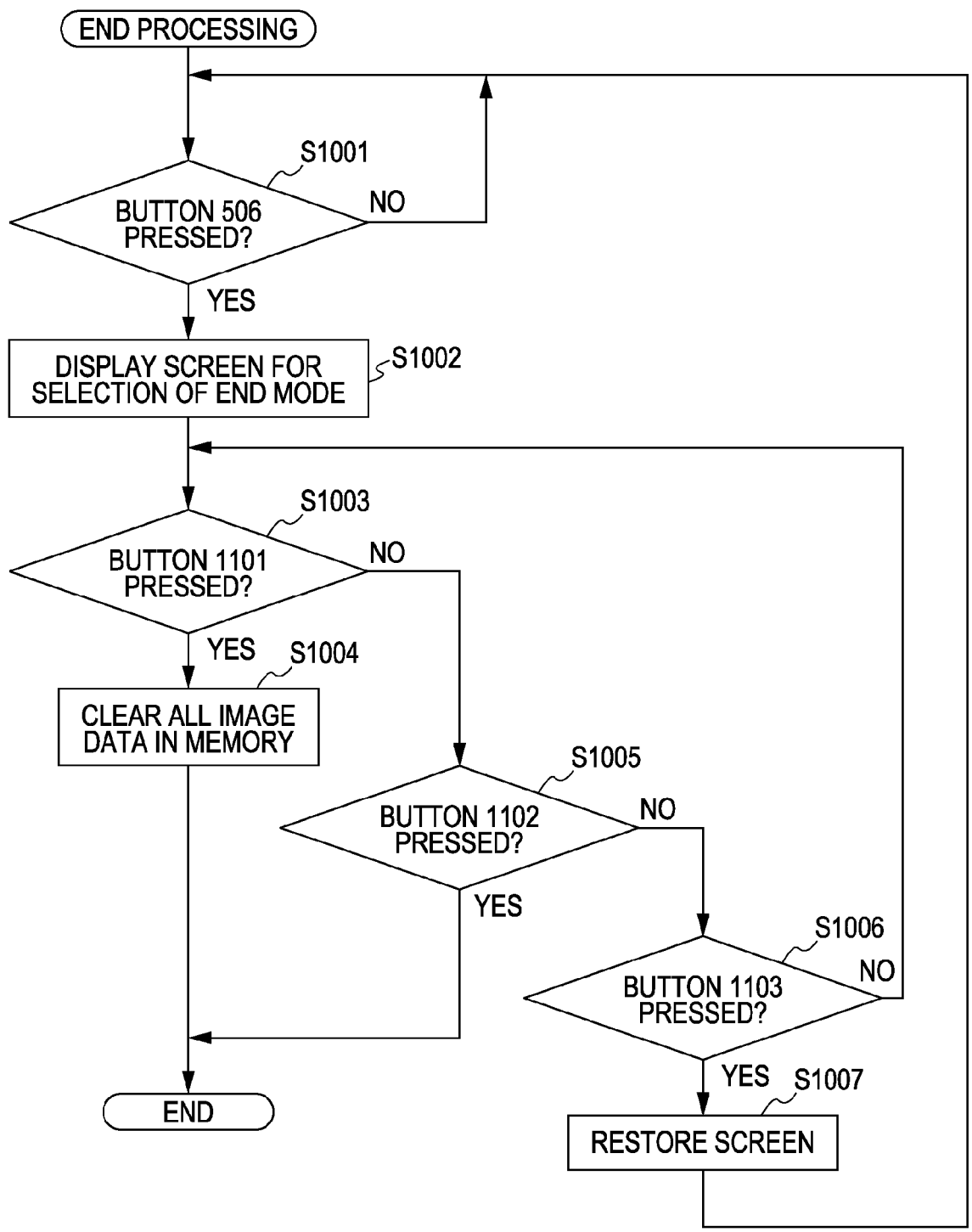
FIG. 10 is a flowchart that illustrates an end processing process performed by the display apparatus.

FIG. 10 is a flowchart that illustrates an end processing process performed by the display apparatus 100. The end processing process is performed by the CPU 401 executing a program based on this flowchart.

In step S1001, the display apparatus 100 determines whether the button 506 ("End") has been pressed. If pressing of the button 506 is determined (YES in step S1001), flow proceeds to step S1002.

Figure 11:
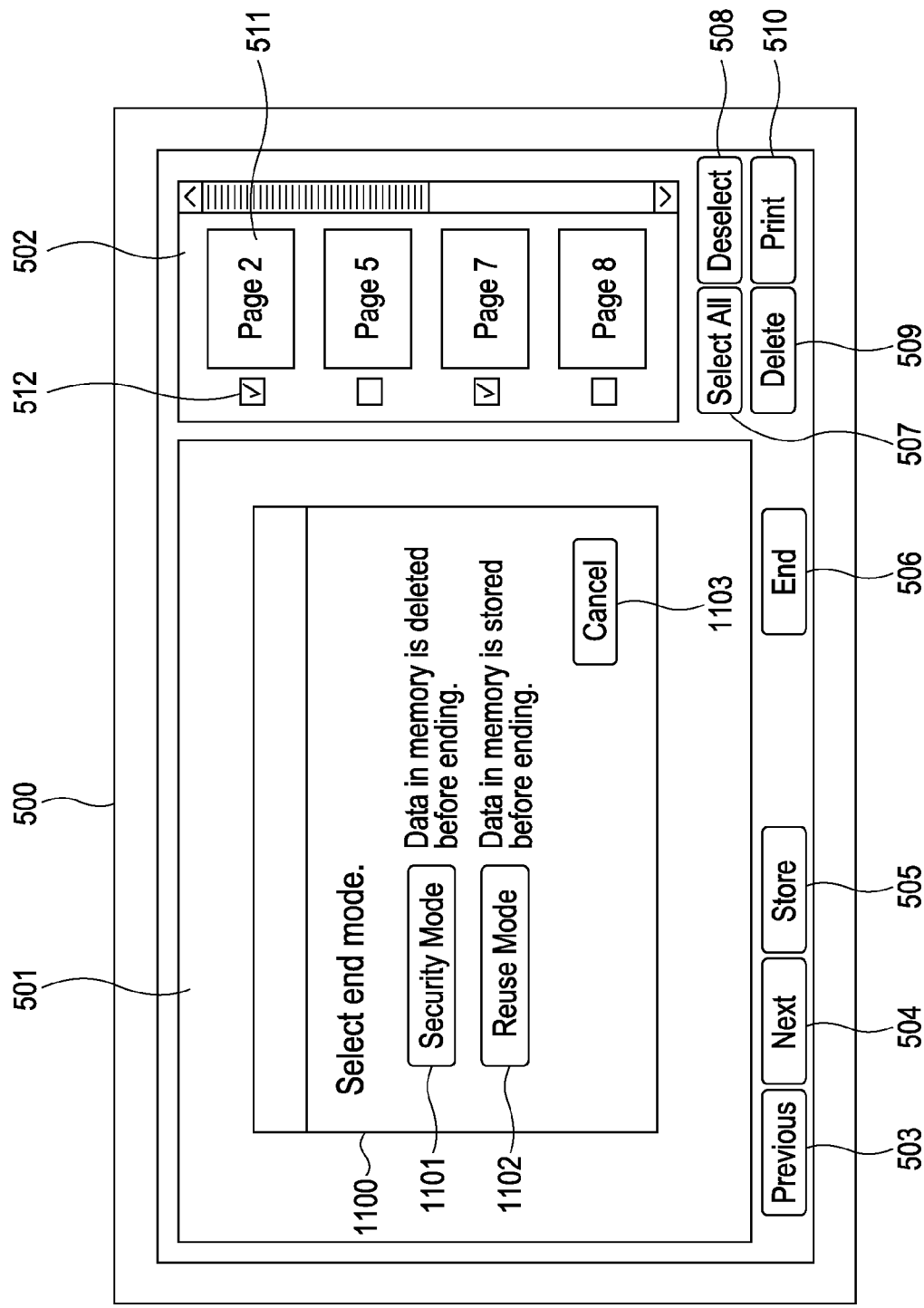
FIG. 11 illustrates an example of a screen that allows a user to select an end mode.

In step S1002, the display apparatus 100 displays a screen that prompts the user to select an end mode. FIG. 11 illustrates an example of such a screen for prompting the user to select the end mode. A screen 1100 is superimposed on the screen 500. Buttons 1101 to 1103 are displayed on the screen 1100. The button 1101 is a button used for selecting a security mode. The button 1102 is a button used for selecting a reuse mode.

In step S1003, the display apparatus 100 determines whether the button 1101 ("Security Mode") has been pressed. If pressing of the button 1101 is determined (YES in step S1003), flow proceeds to step S1004; if not (NO in step S1003), flow proceeds to step S1005.

In step S1004, the display apparatus 100 deletes all image data stored in the storage region in the memory 402. For example, if the display apparatus 100 is temporarily used for a presentation, the security mode is selected to prevent a piece of material used in the presentation from being printed in the future. End processing then ends.

In step S1005, the display apparatus 100 determines whether the button 1102 ("Reuse Mode") has been pressed. If it is determined that the button 1102 has not been pressed (NO in step S1005), flow proceeds to step S1006. If pressing of the button 1102 is determined (YES in step S1005), the display apparatus 100 completes the end processing process without deleting the image data stored in the storage region in the memory 402. For example, if the image data stored in this time needs to be printed in the future, the reuse mode is selected.

In step S1006, the display apparatus 100 determines whether the button 1103 has been pressed. If pressing of the button 1103 is determined (YES in step S1006), flow proceeds to step S1007. If it is determined that the button 1103 has not been pressed (NO in step S1006), which means that none of the buttons 1101 to 1103 has been pressed, flow returns to step S1003.

In step S1107, the display apparatus 100 returns the content displayed on the display unit 404 to a state prior to displaying the screen 1100.

In the foregoing description, the button 505 is used for specifying an image permitted to be printed. However, the button 505 may be replaced with a button used for specifying an image forbidden to be printed. In this case, an image for which the button 505 has not been pressed is specified as a printable image. That is, image data corresponding to an image for which the button 505 has not been pressed is stored in the first storage region in the memory 402. Additionally, a thumbnail image corresponding to the image for which the button 505 has not been pressed is added to and thus displayed in the thumbnail-image display area 502.

As described above, from among a plurality of images sequentially displayed by the display apparatus, one or more printable images can be specified and, from among the printable images, an image to be actually printed can be further specified.

Displaying a list of thumbnail images and allowing the user to select an image to be printed enables printing of an image that was displayed. This can reduce the occurrence of leakage of secret information resulting from printed material taken away.

A participant in a conference or other scenes can take a part of presentation material away as a printed form.

It is not necessary to prepare a printed form of material in advance. It is possible to print only a part of the material desired by the user. This can avoid printing of unnecessary portions. As a result, savings in paper resources can be facilitated.

Second Embodiment

In the first embodiment, image data for an image to be printed is stored in the memory 402 in the display apparatus 100. The image data is transmitted from the display apparatus 100 to the printing apparatus 120, and the image based on the image data is printed.

However, the resolution of image data suitable for being displayed on the display apparatus 100 may often be different from the resolution of image data suitable for being printed by the printing apparatus 120. In such a case, image data having a higher resolution suitable for printing by the printing apparatus 120 can be generated. According to the second embodiment, image data suitable for being printed (hereinafter referred to as "print image data") is generated by the information processing apparatus 110.

Figure 12:
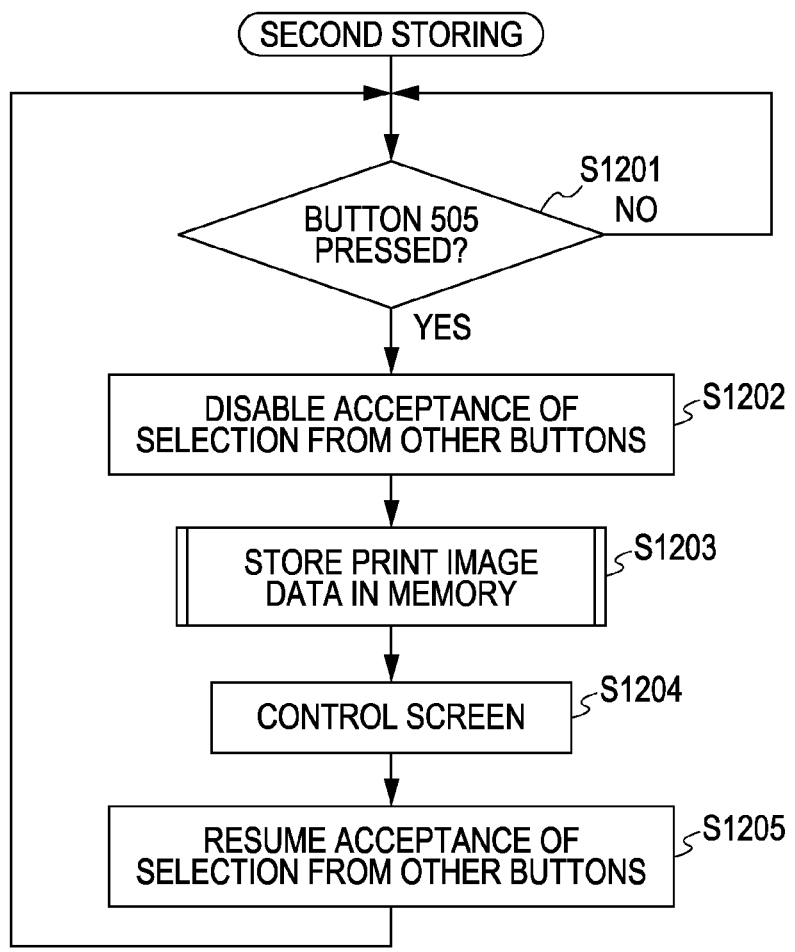
FIG. 12 is a flowchart that illustrates another storing process performed by the display apparatus.

FIG. 12 is a flowchart that illustrates a second storing process performed by the display apparatus 100. The second storing process is performed by the CPU 401 executing a program based on this flowchart.

In step S1201, the display apparatus 100 determines whether the button 505 for storing an image has been pressed.

When pressing of the button 505 is determined (YES in step S1201), flow proceeds to step S1202.

In step S1202, the display apparatus 100 disables the acceptance of selection from the other buttons displayed on the screen 500 and of a command for changing a displayed page from the information processing apparatus 110. In step S1203, the display apparatus 100 stores image data corresponding to an image currently displayed in the main display area 501 in the first storage region in the memory 402. The details will be described below with reference to FIG. 13.

In step S1204, the display apparatus 100 displays a thumbnail image based on thumbnail-image data generated in step S1203 on the thumbnail-image display area 502.

In step S1205, the display apparatus 100 resumes the acceptance of selection from the other buttons displayed on the screen 500 and of a command for changing a displayed image from the information processing apparatus 110.

Figure 13:
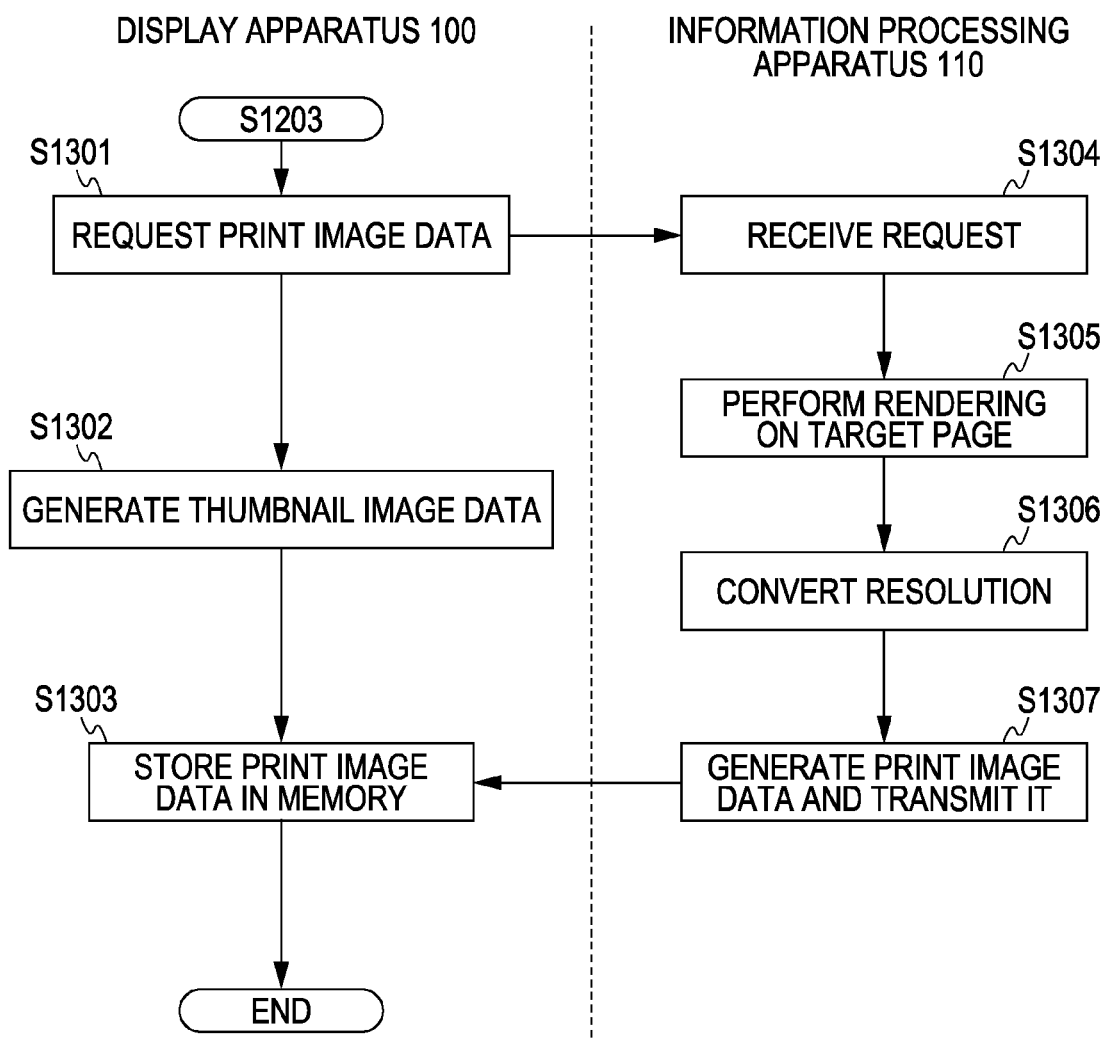
FIG. 13 is a flowchart that illustrates a process performed in step S1203 shown in FIG. 12.

FIG. 13 is a flowchart that illustrates a process performed in step S1203 shown in FIG. 12. This process is performed by the CPU 401 executing a program based on this flowchart.

In step S1301, the display apparatus 100 issues a request for print image data to the information processing apparatus 110. In step S1302, the display apparatus 100 generates thumbnail-image data based on image data corresponding to an image currently displayed in the main display area 501 and stores the thumbnail-image data in the second storage region in the memory 402.

In step S1303, the display apparatus 100 receives the print image data from the information processing apparatus 110 and stores the print image data in the first storage region in the memory 402. The display apparatus 100 adds pointer information indicating print image data to the image data.

The information processing apparatus 110 performs the following steps. First, in step S1304, the information processing apparatus 110 receives a request for the print image data from the display apparatus 100.

In step S1305, the information processing apparatus 110 converts data corresponding to a page displayed on the display apparatus 100 into image data. In step S1306, the information processing apparatus 110 converts the resolution of the image data into a resolution suitable for printing (e.g., 600 dpi, which is a typical resolution in a general printing apparatus). In step S1307, the information processing apparatus 110 generates print image data based on the image data whose resolution has been converted and transmits the print image data to the display apparatus 100.

When the display apparatus 100 performs the printing process based on the flowchart of FIG. 7, the print image data is transmitted to the printing apparatus 120. At this time, the information processing apparatus 110 retrieves pointer information from image data corresponding to a selected thumbnail image and transmits print image data indicated by the pointer information to the printing apparatus 120.

Third Embodiment

In the second embodiment, thumbnail-image data is independently generated and stored. According to the third embodiment, the display apparatus 100 displays a thumbnail image based on print image data.

Figure 14:
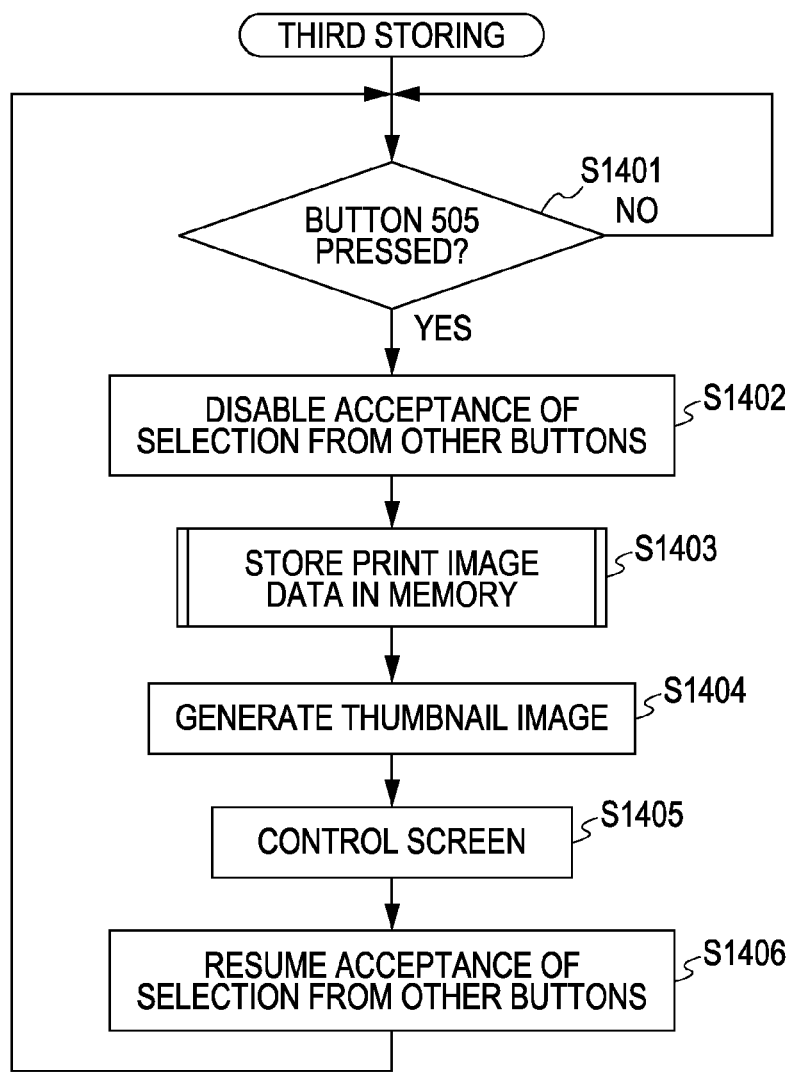
FIG. 14 is a flowchart that illustrates another storing process performed by the display apparatus.

FIG. 14 is a flowchart that illustrates a third storing process performed by the display apparatus 100. The third storing process is performed by the CPU 401 executing a program based on this flowchart.

In step S1401, the display apparatus 100 determines whether the button 505 for storing an image has been pressed. When pressing of the button 505 is determined (YES in step S1401), flow proceeds to step S1402.

In step S1402, the display apparatus 100 disables the acceptance of selection from the other buttons displayed on the screen 500 and of a command for changing a displayed page from the information processing apparatus 110.

In step S1403, the display apparatus 100 stores print image data corresponding to an image currently displayed in the main display area 501 in the first storage region in the memory 402. The details will be described below with reference to FIG. 15.

In step S1404, the display apparatus 100 generates a thumbnail image by down-sampling the print image data. In step S1405, the thumbnail image is displayed in the thumbnail-image display area 502.

In step S1406, the display apparatus 100 resumes the acceptance of selection from the other buttons displayed on the screen 500 and of a command for changing a displayed image from the information processing apparatus 110.

Figure 15:
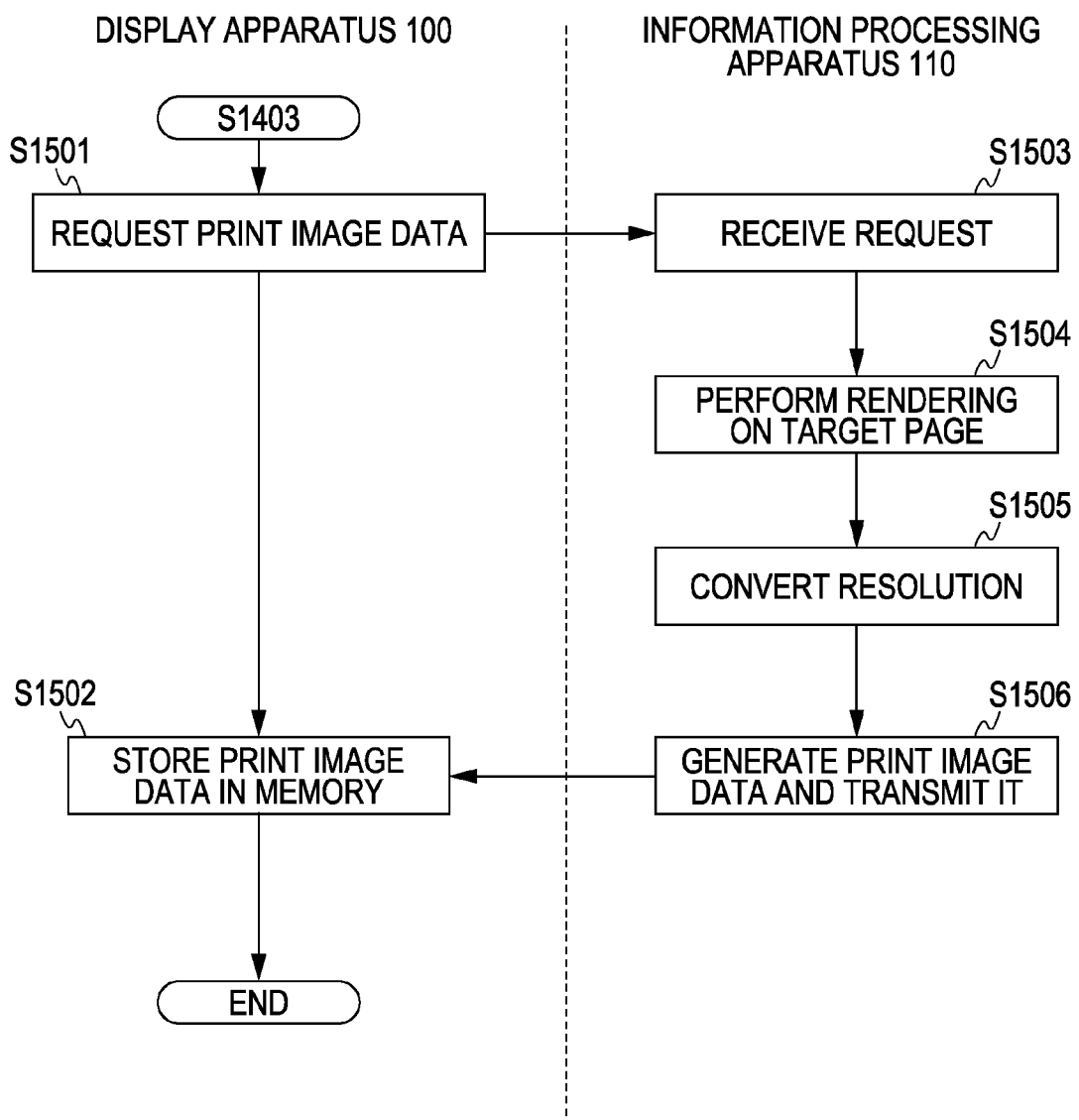
FIG. 15 is a flowchart that illustrates a process performed in step S1403 shown in FIG. 14.

FIG. 15 is a flowchart that illustrates a process performed in step S1403 shown in FIG. 14. This process is performed by the CPU 401 executing a program based on this flowchart.

In step S1501, the display apparatus 100 issues a request for print image data to the information processing apparatus 110. In step S1502, the display apparatus 100 receives print image data from the information processing apparatus 110 and stores the print image data in the first storage region in the memory 402.

The information processing apparatus 110 performs the following steps. First, in step S1503, the information processing apparatus 110 receives a request for the print image data from the display apparatus 100.

In step S1504, the information processing apparatus 110 converts data corresponding to a page displayed on the display apparatus 100 into image data. In step S1505, the information processing apparatus 110 converts the resolution of the image data into a resolution suitable for printing (e.g., 600 dpi, which is a typical resolution in a general printing apparatus). In step S1506, the information processing apparatus 110 generates print image data based on the image data whose resolution has been converted and transmits the print image data to the display apparatus 100.

Fourth Embodiment

In an example illustrated in FIG. 5, even when the presentation material is displayed in the main display area 501, the thumbnail-image display area 502 and the buttons 503 to 510 are clearly displayed.

Figure 16:
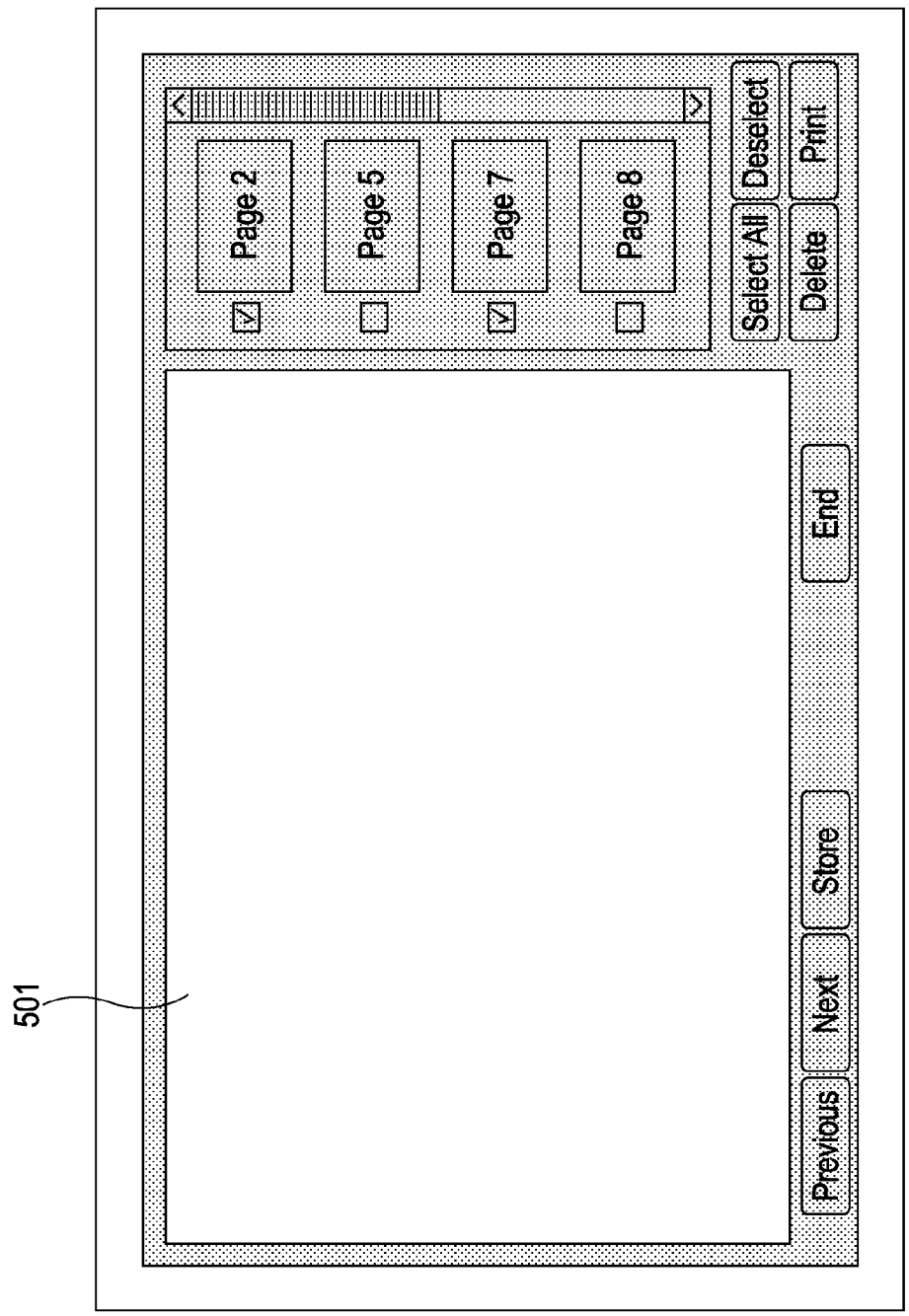
FIG. 16 illustrates a variation of a screen layout displayed on the display apparatus.

FIG. 16 illustrates a variation of the screen layout illustrated FIG. 5. In an example illustrated in FIG. 16, the brightness of display of the thumbnail-image display area 502 and the buttons 503 to 510 is darker than normal. While the user does not want to store or print image data, the intensity of portions other than the main display area 501 is reduced to enhance legibility of material displayed in the main display area 501. After the completion of the presentation, the brightness of the portions other than the main display area 501 returns to normal. A switch for switching control of the brightness as described above between automatic and manual operations may be provided as a hard key or soft key.

Fifth Embodiment

The present invention can also be achieved by supplying a program of software that performs functions of at least one of the foregoing embodiments from directly or remotely to a system or an apparatus and causing a computer of the system or the apparatus to read and execute the supplied program. In this case, the program may be replaced with any other form as long as it has the functions of the program.

Therefore, program code itself installable in a computer to enable the computer to perform the functional processing of an aspect of the present invention can realize the present invention. In this case, the program can have any form, such as object code, a program executable by an interpreter, and script data suppliable to an operating system (OS), as long as it has the functions of the program.

Various media can be used as a storage medium for supplying the program. Examples of the storage medium include, but are not limited to, a floppy disk, a hard disk, an optical disk, a magneto-optical disk (MO), a compact-disk read-only memory (CD-ROM), a compact disk recordable (CD-R), a CD-Rewritable (CD-RW), magnetic tape, a nonvolatile memory card, a ROM, and a digital versatile disk (DVD), such as a DVD-ROM and a DVD-R.

One example of a method for supplying the program is to cause a user to access a website on the Internet using a browser of a client computer and to download a program into a storage medium (e.g., a hard disk). In this case, a computer program itself according to an aspect of the present invention or a compressed file of the program with an automatic installer can be downloaded.

Moreover, program code constituting a program according to an aspect of the present invention may be divided into a plurality of files and each file may be downloaded from different websites.

A program according to an aspect of the present invention may be distributed to users through storage media, such as CD-ROMs, that store its encrypted program. In this case, a user who satisfies a predetermined condition can download information regarding a decryption key from a website over the Internet, and the encrypted program can be installed in a computer in a form that allows the encrypted program to be executed using the key information.

A form other than executing a read program and realizing the functions of at least one of the embodiments may be used. For example, performing actual processing in part or in entirety by an operating system (OS) running on a computer in accordance with instructions of the program can realize the functions of at least one of the embodiments described above.

Further, a program read from a storage medium may be written on a memory included in a function expansion board inserted into a computer or in a function expansion unit connected to the computer. In this case, after that, a CPU included in the feature expansion board or the feature expansion unit can perform actual processing in part or in entirety in accordance with instructions of the program, for realizing the functions of at least one of the embodiments described above.

As previously described, a printable image and an image to be actually printed can be independently specified. Therefore, an image permitted to be printed can be restricted while at the same time printing of a desired image can be instructed.

While the present invention has been described with reference to exemplary embodiments, it is to be understood that the present invention is not limited to the disclosed exemplary embodiments. The scope of the following claims is to be accorded the broadest interpretation so as to encompass all modifications, equivalent structures and functions.

What is claimed is:

1. A display apparatus comprising:
    a display unit configured to display a screen in which a first area, where a plurality of images are exchanged and then displayed, and a second area, where plural preview images of images selected by a user from the plurality of images displayed on the first area are displayed, are arranged; and
    a print control unit configured to control a print unit to perform printing based on image data of a preview image selected by a user from the plural preview images displayed on the second area.

2. The display apparatus according to claim 1, wherein a preview image of an image that previously was displayed on the first area is displayed on the second area.

3. The display apparatus according to claim 1, wherein a button is displayed on the display unit, the display apparatus further comprising a generation unit configured to generate an image,
    wherein, in response to a user pressing the button while an image is displayed on the first area, the generation unit generates a preview image of the image displayed on the first area, and
    wherein the display unit displays the generated preview image on the second area.

4. The display apparatus according to claim 1, wherein, in response to an instruction from a user, the display unit performs displaying such that an image is undisplayed on the second area while an image is being displayed on the first area.

5. The display apparatus according to claim 1, wherein the image data, of a preview image selected by a user from the plural preview images displayed on the second area, corresponds to an image displayed on the first area.

6. The display apparatus according to claim 1, wherein the image data, of a preview image selected by a user from the plural preview images displayed on the second area, corresponds to an image displayed on the second area.

7. The display apparatus according to claim 1, further comprising an all-selection unit configured to select, according to an instruction from a user, all of the plural preview images displayed on the second area.

8. The display apparatus according to claim 1, further comprising an all selection cancelling unit configured to cancel, according to an instruction from a user, all selection performed by a user on the plural preview images displayed on the second area.

9. The display apparatus according to claim 1, further comprising a selection/selection-cancelling unit configured to perform, on an image-by-image basis, selection or selection-cancelling of the plural preview images displayed on the second area.

10. The display apparatus according to claim 1, further comprising a reception unit configured to externally receive image data corresponding to an image to be displayed on the first area, in a case where a button displayed on the screen is pressed by a user.

11. The display apparatus according to claim 1, wherein each preview image selected by a user from the plurality of images displayed on the first area is a printable image permitted to be printed and each preview image not selected by a user from the plurality of images is an image that is not permitted to be printed.

12. The display apparatus according to claim 11, wherein each of the plural preview images displayed on the second area is a printable image, and, for each plural printable image not selected by a user, the print control unit restricts the print unit from perform printing on that printable image.

13. A control method for a display apparatus, the control method comprising:
    displaying a screen in which a first area, where a plurality of images are exchanged and then displayed, and a second area, where plural preview images of images selected by a user from the plurality of images displayed on the first area are displayed, are arranged; and controlling to perform printing based on image data of a preview image selected by a user from the plural preview images displayed on the second area.

14. The control method according to claim 13, wherein a preview image of an image that previously was displayed on the first area is displayed on the second area.

15. The control method according to claim 13, wherein a button is displayed, the control method further comprising generating an image,
   wherein, in response to a user pressing the button while an image is displayed on the first area, generating includes generating a preview image of the image displayed on the first area, and
   wherein displaying includes displaying the generated preview image on the second area.

16. The control method according to claim 13, wherein, in response to an instruction from a user, displaying includes performing displaying such that an image is undisplayed on the second area while an image is being displayed on the first area.

17. The control method according to claim 13, wherein the image data, of a preview image selected by a user from the plural preview images displayed on the second area, corresponds to an image displayed on the first area.

18. The control method according to claim 13, wherein the image data, of a preview image selected by a user from the plural preview images displayed on the second area, corresponds to an image displayed on the second area.

19. The control method according to claim 13, further comprising selecting, according to an instruction from a user, all of the plural preview images displayed on the second area.

20. The control method according to claim 13, further comprising cancelling, according to an instruction from a user, all selection performed by a user on the plural preview images displayed on the second area.

21. The control method according to claim 13, further comprising performing, on an image-by-image basis, selection or selection-cancelling of the plural preview images displayed on the second area.

22. The control method according to claim 13, further comprising externally receiving image data corresponding to an image to be displayed on the first area, in a case where a button displayed on the screen is pressed by a user.

23. The control method according to claim 13, wherein each preview image selected by a user from the plurality of images displayed on the first area is a printable image permitted to be printed and each preview image not selected by a user from the plurality of images is an image that is not permitted to be printed.

24. The control method according to claim 23, wherein each of the plural preview images displayed on the second area is a printable image, and, for each plural printable image not selected by a user, controlling to perform printing includes restricting printing on that printable image.

25. A non-transitory computer readable medium storing a program that causes a display apparatus to perform a control method, the control method comprising:
   displaying a screen in which a first area, where a plurality of images are exchanged and then displayed, and a second area, where plural preview images of images selected by a user from the plurality of images displayed on the first area are displayed, are arranged; and
   controlling to perform printing based on image data of a preview image selected by a user from the plural preview images displayed on the second area.

* * * * *